US 8,194,620 B2
Jun. 5, 2012

(12) United States Patent
Fang

(10) Patent No.: US 8,194,620 B2
(45) Date of Patent: Jun. 5, 2012

(54) METHOD FOR TERMINALS TO SWITCH THE REVERSE TRAFFIC CHANNELS IN CDMA GROUP CALL SERVICE

(75) Inventor: Huiying Fang, Shenzhen (CN)

(73) Assignee: ZTE Corporation (CN)

( * ) Notice: Subject to any disclaimer, the term of this patent is extended or adjusted under 35 U.S.C. 154(b) by 1005 days.

(21) Appl. No.: 12/025,683

(22) Filed: Feb. 4, 2008

(65) Prior Publication Data

US 2011/0149940 A9 Jun. 23, 2011

Related U.S. Application Data

(63) Continuation of application No. PCT/CN2005/001400, filed on Sep. 5, 2005.

(51) Int. Cl.
 *H04B 7/216* (2006.01)

(52) U.S. Cl. ........ 370/335; 370/310; 370/315; 370/316; 370/319; 370/320; 370/342; 370/464; 370/479

(58) Field of Classification Search .......... 370/226–228, 370/259–271, 310, 328, 329, 335; 455/403, 455/422.1, 425, 426.1, 450–452.1
See application file for complete search history.

(56) References Cited

U.S. PATENT DOCUMENTS

| | | | |
|---|---|---|---|
| 6,393,287 B1 | 5/2002 | Munekata et al. | |
| 6,442,152 B1 * | 8/2002 | Park et al. | 370/341 |
| 6,519,239 B1 * | 2/2003 | Panchal et al. | 370/335 |
| 6,963,543 B2 * | 11/2005 | Diep et al. | 370/261 |
| 2002/0172165 A1 * | 11/2002 | Rosen et al. | 370/310 |
| 2002/0181423 A1 * | 12/2002 | Chen et al. | 370/337 |
| 2009/0036118 A1 * | 2/2009 | Liu et al. | 455/426.1 |

FOREIGN PATENT DOCUMENTS

| | | |
|---|---|---|
| CN | 200410039022.5 | 8/2004 |
| CN | 02814696.4 | 12/2004 |

* cited by examiner

*Primary Examiner* — Brian D Nguyen
*Assistant Examiner* — Charles C Jiang
(74) *Attorney, Agent, or Firm* — David R. Stevens; Stevens Law Group

(57) ABSTRACT

The present invention discloses a method for terminals to switch among the reverse traffic channels in CDMA group call service. During the establishing procedure of the standard group call service, the originating call terminal sets the long code mask for the reverse dedicated traffic channel, establishes the reverse dedicated traffic channel and obtains the talk right to become the speaking terminal; the called terminal sets the long code mask for the reverse shared traffic channel, establishes the reverse shared traffic channel and becomes the listening terminal. After the speaking terminal successfully releases the talk right, it resets the long code mask of the reverse traffic channel as the long code mask of the reverse shared traffic channel and switches to the reverse shared traffic channel to become the listening terminal. After the listening terminal applies for and gets the talk right, it resets the long code mask of the reverse traffic channel as the long code mask of the reverse dedicated traffic channel and switches to the reverse dedicated traffic channel to become the speaking terminal. According to the present invention, in the standard group call service, the terminal of one group can rapidly switch to the corresponding reverse traffic channel when the status is changed.

9 Claims, 2 Drawing Sheets

| 41 | 38 37 | 28 | 27 | 0 |
|---|---|---|---|---|
| 11110 | 000000000 | | group identifier | |

| 41 | 38 37 | 28 | 27 | 0 |
|---|---|---|---|---|
| 11111 | PILOT_PN | | group identifier (or group identifier + shared channel number) | |

METHOD FOR TERMINALS TO SWITCH THE REVERSE TRAFFIC CHANNELS IN CDMA GROUP CALL SERVICE

TECHNICAL FIELD

The present invention relates to mobile communication field, especially refers to a method for the terminals to switch among reverse traffic channels in group call service for CDMA trunked communication system.

TECHNOLOGY BACKGROUND

CDMA trunked communication system combines the CDMA techniques with the dedicated dispatch communication system, and by using the half-duplex communication method, it can realize fast connection, and support group call (namely, a one-to-multiple calling method), therefore it can be widely applied in enterprises, security department, police department and military that require for a high demand of command and control functions.

The standard group call service (also named as traditional group call service or broadcast group call service) in CDMA trunked communication system supports group call for the group with large capacity (a group comprises thousands of users and they all locate within a small sector) within a small scope through the method of sharing the forward and reverse service channels in the sectors.

In the standard group call service in CDMA trunked communication system, each terminal in the group can have different status at different times: speaking status and listening status. When a terminal is in the speaking status, it is called the speaking terminal and when the terminal is in the listening status, it is called the listening terminal or non-speaking terminal. Since the standard group call service employs half-duplex communication method, there can be at most only one speaking terminal in one group at a time and others are all listening terminals. The speaking terminal can send out voice and signaling in the reverse link while the listening terminal can only send signaling but no voice in the reverse link.

In order to support the needs of standard group call service in CDMA trunked communication system, the reverse traffic channel built in each sector on the Base Station (BS) side in dispatch area comprises: one reverse dedicated traffic channel and one or more reverse shared traffic channels. The reverse dedicated traffic channel is used to transmit reverse voice and signaling by the speaking terminal that may exist in the sector; the reverse shared traffic channel is used to send reverse signaling by all the listening terminals of said group in the sector.

In the standard group call service, since the terminal can only be in one status at any moment, and while in listening status and speaking status, the reverse traffic channels for transmitting reverse information are different, it needs to solve the fast switching problem of the reverse traffic channels when the two different statuses of the terminals are switched.

The current on-going CDMA group call service allocates one dedicated reverse traffic channel for each terminal in the group. Although the terminal can be in different status at different times, however, there is no problem about switching between the dedicated reverse traffic channel and the shared traffic channel. As a result, the current on-going CDMA group call service does not provide a technical solution for realizing fast switching of the reverse traffic channels when the two different statuses of the terminals are switched.

SUMMARY OF THE INVENTION

The technical problem that needs to be solved in the present invention is to propose a method for terminals to switch among reverse traffic channels in the group call service in CDMA system, thus in the standard group call service, the group terminals can rapidly switch to the corresponding reverse traffic channel when the status has changed.

In order to solve the above technical problem, the present invention proposes a method for terminals to switch among reverse traffic channels in the group call service in CDMA system, which comprises following steps:

(a) during the establishing procedure of the standard group call service, the originating call terminal sets a long code mask of a reverse traffic channel as a long code mask of a reverse dedicated traffic channel, establishes the reverse dedicated traffic channel and obtains the talk right to become the speaking terminal; the called terminal sets the long code mask of the reverse shared traffic channel as a long code mask of a reverse dedicated traffic channel, establishes the reverse shared traffic channel and becomes the listening terminal;

(b) after the speaking terminal successfully releases the talk right, it resets the long code mask of the reverse traffic channel as the long code mask of the reverse shared traffic channel and switches to the reverse shared traffic channel to become the listening terminal; after the listening terminal applies for and gets the talk right, it resets the long code mask of the reverse traffic channel as the long code mask of the reverse dedicated traffic channel and switches to the reverse dedicated traffic channel to become the speaking terminal.

Additionally, the above method also possesses the following features: said step (a) can furthermore be divided into the following steps:

(a1) CDMA trunked communication system initiates the standard group call service request;

(a2) during the establishing procedure for the standard group call service, at the individual sector, the base station in the dispatch area configures demodulation resources of the reverse dedicated service channel and the reverse shared service channel required by the standard group call service, informs the originating call terminal of the information that is needed in constructing the long code mask of the reverse dedicated traffic channel, and informs the called terminal of the information that is needed in constructing the long code mask of the reverse shared traffic channel;

(a3) based on the received information, the originating call terminal constructs the long code mask of the reverse dedicated traffic channel and uses that as the long code mask of its reverse traffic channel, establishes the reverse dedicated traffic channel, on which it performs signaling interaction with the network, and obtains the talk right to become the speaking terminal; based on the received information, every called terminal constructs the long code mask of the reverse shared traffic channel and uses that as the long code mask of its reverse traffic channel, establishes the reverse shared traffic channel, on which it performs signaling interaction with the network, obtains the talk right to become the listening terminal.

By employing said method in the present invention, in the standard group call service in the CDMA trunked communication system, when the status of terminals changes, through resetting the long code mask of the reverse traffic channel by the terminal, fast inter-switching between the reverse shared traffic channel and the reverse dedicated traffic channel, and thereby fast switching between the speaking terminal and the listening terminal, can be realized, therefore it can be efficiently ensured that the half-duplex communication scheme proceeds successfully among group users in the standard group call service.

PREFERRED EMBODIMENTS OF THE INVENTION

The following part further describes the method of the present invention in detail by taking the CDMA trunked communication system as an example with reference to the diagrams and the exemplifying embodiments.

Figures 1, 2A, 2B:
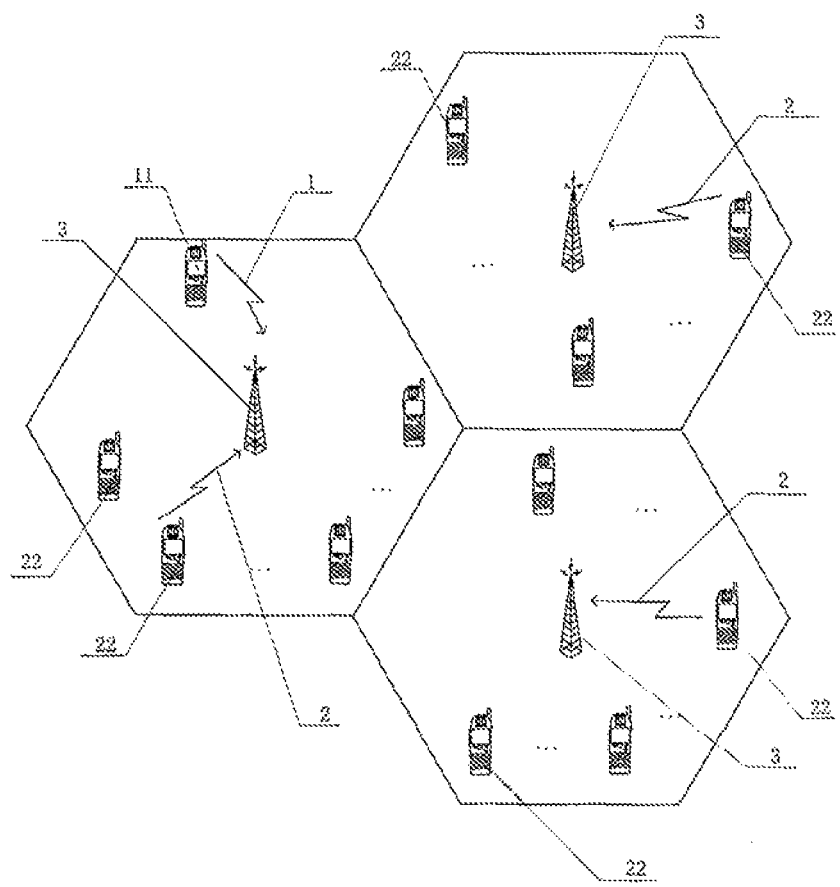
FIG. 1 is a diagram of the reverse traffic channel of the standard group call service in the CDMA trunked system in one embodiment of the present invention.
FIG. 2A and FIG. 2B are structural diagrams of corresponding long code masks of the reverse traffic dedicated channel and reverse shared traffic channel respectively in one embodiment of the present invention.

FIG. 1 is an example for the reverse traffic channel of the standard group call service in the CDMA trunked communication system. As it is shown in the diagram, a reverse dedicated traffic channel 1 is established for the speaking terminal 11 within the group in each sector on the Base Station side in the dispatch area, which is used for transmitting reverse voice and signaling of the speaking terminal; one or more reverse shared traffic channels 2 are established for the listening terminal (non-speaking terminal) 22 within the group, which is used for transmitting signaling of all the listening terminals (non-speaking terminals) in the sector.

FIG. 2A shows the structure of the long code mask of the reverse dedicated traffic channel. As it is shown in the diagram, the long code mask of the reverse dedicated traffic channel comprises three parts, bit38-bit41 are used to distinguish different types of long code mask, bit28-bit37 are the filling bit, and bit1-bit27 are the group identifier. The long code mask of the reverse dedicated traffic channel is only differentiated by way of the group identifier; the long code masks of the reverse dedicated traffic channels in different sectors within one group are the same.

FIG. 2B shows the long code mask structure of the reverse shared traffic channel which also comprises three parts: bit38-bit41 are the identity identifier, bit28-bit37 are written with Pilot-PN offset information, which is used to distinguish reverse shared traffic channels in different sectors; bit1-bit27 are the group identifier, which also needs to include the identifier information for shared channel number if more than one reverse shared traffic channels are established in the same sector with the same group. Therefore, besides using the group identifier, the long code mask of the reverse shared traffic channel can also use the Pilot_PN offset (PILOT_PN) of the sectors to be distinguished; the long code masks of the reverse shared traffic channels of different sectors within the same group are different.

Figure 3:
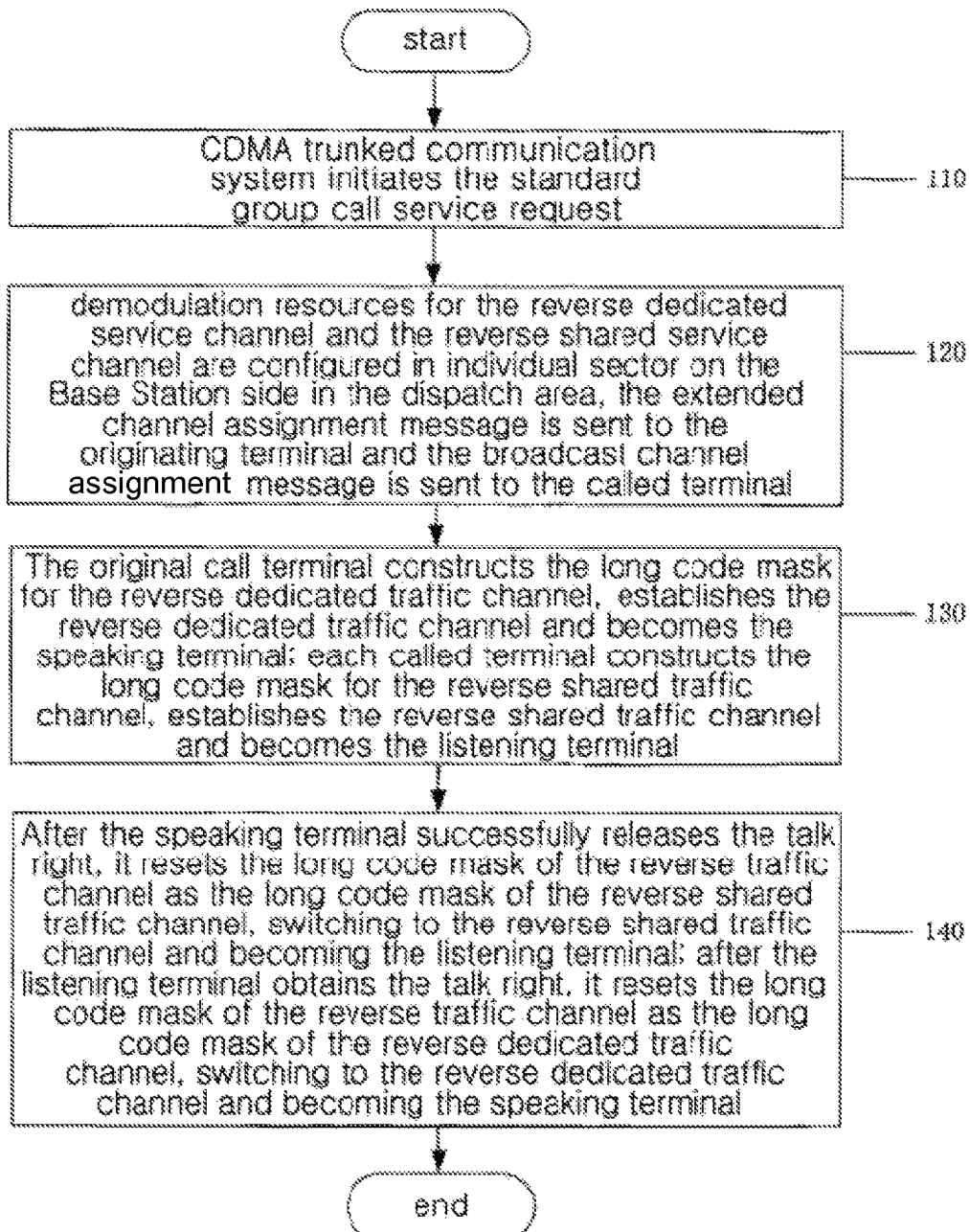
FIG. 3 is flow charts for the channel establishment of the reverse traffic channels and for the inter-switching among reverse traffic channels of terminals in the standard group call service of CDMA communication system in one embodiment of the present invention.

FIG. 3 shows the flow chart of the establishment of reverse traffic channels of the terminals as well as the inter-switching procedure between the channels during the process of standard group call service of the embodiment, in which it comprises following steps:

Step 110, CDMA trunked communication system initiates the standard group call service request;

Step 120, demodulation resources for reverse dedicated service channel and reverse shared service channel of the standard group call service are configured in the individual sector on the Base Station side in the dispatch area, then the extended channel assignment message (ECAM message) including the group identifier information that is needed to construct the long code mask of the reverse dedicated traffic channel is sent to the originating call terminal, and the broadcast channel assignment message including the group identifier and the Pilot_PN offset information that are needed to construct the long code mask of the reverse shared traffic channel is sent to the called terminal;

Step 130, after the originating call terminal receives the extended channel assignment message, it constructs the long code mask of the reverse dedicated traffic channel based on the information carried by the message and uses that as the long code mask of its reverse traffic channel, establishes the reverse dedicated traffic channel, by which it performs signaling interaction with the network, obtains the talk right to become the speaking terminal;

after receiving the broadcast channel configuration message, each called terminal constructs the long code mask of the reverse shared traffic channel based on the information carried by the message and uses that as the long code mask of its reverse traffic channel, establishes the reverse shared traffic channel, by which it performs signaling interaction with the network to become the listening terminal;

Step 140, when the speaking terminal wants to release talk right, it sends the information of releasing talk right to the network in the reverse dedicated traffic channel. After receiving the confirmation message of releasing talk right form the network, the speaking terminal resets the long code mask of the reverse traffic channel as the long code mask of the reverse shared traffic channel, switching to the reverse shared traffic channel and becoming the listening terminal;

when the listening terminal wants to obtain the talk right, it will send talk right request message to the network by the reverse shared traffic channel. After receiving the authorization message from the network, the listening terminal resets the long code mask of the reverse traffic channel as the long code mask of the reverse dedicated traffic channel, switching to the reverse dedicated traffic channel and becoming the speaking terminal. When there are many reverse shared traffic channels in one sector, said speaking terminal can choose one of them according to Hash algorithm or random numbers algorithm.

In said step 140, in the duration period of standard group call service, the switching between the reverse dedicated traffic channel and the reverse shared traffic channel for the terminal can repeat several times until the service is completed.

The scheduling server is responsible for processing terminal talk right application, release, and occupation. The scheduling server sends the information of talk right application status of the listening terminal at regular time intervals to the speaking terminal that has talk right; when the speaking terminal successfully releases the talk right and no new listening terminal applies for the talk right, the scheduling server needs to give suggestion of talk right idle to each terminal in the group.

INDUSTRY APPLICABILITY

The method in present invention can be applied in the standard group call service in CDMA trunked communication system. When the terminal status changes, by resetting the long code mask of the reverse traffic channel, it can realize fast inter-switching of terminals between the reverse shared traffic channel and the reverse dedicated traffic channel, therefore it effectively guarantees that the half-duplex communication scheme proceeds successfully among group users in the standard group call service.

What we claimed is:

1. A method for terminals to switch among reverse traffic channels in a group call service in CDMA system, comprising following steps:
    (a) during establishing procedure of a standard group call service, an originating call terminal sets a long code mask of a reverse traffic channel as a long code mask of a reverse dedicated traffic channel, establishes the reverse dedicated traffic channel and obtains talk right to become a speaking terminal; a called terminal sets a long code mask of a reverse traffic channel as a long code mask of a reverse shared traffic channel, establishes the reverse shared traffic channel and becomes a listening terminal;
    (b) after the speaking terminal successfully releases the talk right, it resets the long code mask of the reverse traffic channel as the long code mask of the reverse shared traffic channel for switching to the reverse shared traffic channel to become the listening terminal; after the listening terminal applies for and gets the talk right, it resets the long code mask of the reverse traffic channel as the long code mask of the reverse dedicated traffic channel for switching to the reverse dedicated traffic channel to become the speaking terminal.

2. The method of claim 1, wherein said step (a) is further divided into the following steps:
    (a1) CDMA trunked communication system initiates a standard group call service request;
    (a2) during the establishing procedure for the standard group call service, at each sector, a base station in the dispatch area configures demodulation resources of the reverse dedicated traffic channel and the reverse shared traffic channel required by the standard group call service, informs said originating call terminal of information that is needed in constructing the long code mask of the reverse dedicated traffic channel, and informs said called terminal of the information that is needed in constructing the long code mask of the reverse shared traffic channel;
    (a3) based on the received information, the originating call terminal constructs the long code mask of the reverse dedicated traffic channel and uses that as the long code mask of its reverse traffic channel, establishes the reverse dedicated traffic channel, on which it performs signaling interaction with network, and obtains the talk right to become the speaking terminal; based on the received information, every called terminal constructs the long code mask of the reverse shared traffic channel and uses that as the long code mask of its reverse traffic channel, establishes the reverse shared traffic channel, on which it performs signaling interaction with the network, obtains the talk right to become the listening terminal.

3. The method of claim 2, wherein after configuration of said demodulation resources is completed, said base station sends the information that is needed in constructing long code mask of the reverse dedicated traffic channel to the originating call terminal by an extended channel assignment message, and after said originating call terminal receives the information, it constructs the long code mask of the reverse dedicated traffic channel and establishes the reverse dedicated traffic channel.

4. The method of claim 2, wherein after configuration of said demodulation resources is completed, said base station sends the information that is needed in constructing long code mask of the reverse shared traffic channel to the called terminal by a broadcast channel dispatching message, and after said called terminal receives the information, it constructs the long code mask of the reverse shared traffic channel and establishes the reverse shared traffic channel.

5. The method of claim 2, wherein the information that is needed in constructing long code mask of the reverse dedicated traffic channel sent to the originating call terminal by said base station includes group identifier.

6. The method of claim 2, wherein the information that is needed in constructing long code mask of the reverse shared traffic channel sent to the called terminal by said base station includes Pilot-PN information of sectors and group identifier.

7. The method of claim 6, wherein in said step (a), the base station sets more than one reverse shared traffic channels for the called terminal of the same group within one sector, and the information that is needed to construct long code mask of the reverse shared traffic channel also includes identifier information of shared channel number.

8. The method of claim 1, wherein in said step (b), when the speaking terminal wants to release talk right, it first sends out a talk right release message to the network, and after receiving a talk right release confirmation message from the network, then the talk right is released successfully.

9. The method of claim 1, wherein in said step (b), when the listening terminal applies for talk right, it sends out a talk right request message to the network by the reverse shared traffic channel, and after receiving an authorization message from the network, then the talk right is obtained successfully.

* * * * *

UNITED STATES PATENT AND TRADEMARK OFFICE
CERTIFICATE OF CORRECTION

| | | |
|---|---|---|
| PATENT NO. | : 8,194,620 B2 | Page 1 of 1 |
| APPLICATION NO. | : 12/025683 | |
| DATED | : June 5, 2012 | |
| INVENTOR(S) | : Huiying Fang | |

It is certified that error appears in the above-identified patent and that said Letters Patent is hereby corrected as shown below:

Column 6,

Line 23, Claim 4, "dispatching" should be changed to --assignment--

Signed and Sealed this
Twenty-fourth Day of July, 2012

David J. Kappos
*Director of the United States Patent and Trademark Office*